(12) United States Patent
Lee et al.

(10) Patent No.: US 7,891,631 B2
(45) Date of Patent: Feb. 22, 2011

(54) SUPPORTING STRUCTURE AND TENSION ADJUSTING MECHANISM THEREOF

(75) Inventors: Yung-Ta Lee, Sinjhuang (TW); Yu-Tsun Hsu, Sinjhuang (TW)

(73) Assignee: Jarllytec Co., Ltd., Taipei County (TW)

(*) Notice: Subject to any disclaimer, the term of this patent is extended or adjusted under 35 U.S.C. 154(b) by 380 days.

(21) Appl. No.: 12/149,850

(22) Filed: May 8, 2008

(65) Prior Publication Data
US 2009/0072112 A1 Mar. 19, 2009

(30) Foreign Application Priority Data
Aug. 16, 2007 (TW) .............................. 96130292 A

(51) Int. Cl.
*A47G 29/00* (2006.01)
(52) U.S. Cl. .................. 248/371; 248/123.11; 248/676; 248/176.3; 248/920; 248/921; 248/922; 248/923; 248/292.11; 248/133; 474/101
(58) Field of Classification Search ............ 248/123.11, 248/676, 372.1, 176.3, 920–923, 371, 183.1, 248/292.11, 133; 474/205, 148, 156, 201, 474/101, 136–137, 113; 396/419; 361/679.02, 361/679.21
See application file for complete search history.

(56) References Cited

U.S. PATENT DOCUMENTS

| | | | | |
|---|---|---|---|---|
| 3,494,208 | A * | 2/1970 | Alagna ......................... | 474/199 |
| 4,631,044 | A * | 12/1986 | Redmon ...................... | 474/114 |
| 4,684,357 | A * | 8/1987 | Hooper ........................ | 474/101 |
| 7,338,019 | B2 * | 3/2008 | Liu et al. ................ | 248/123.11 |
| 7,597,302 | B2 * | 10/2009 | Lee et al. ...................... | 248/371 |
| 7,628,365 | B2 * | 12/2009 | Lee ......................... | 248/297.21 |
| 7,637,463 | B2 * | 12/2009 | Yen et al. ..................... | 248/157 |
| 7,690,605 | B2 * | 4/2010 | Lee et al. ...................... | 248/133 |
| 2009/0062046 | A1 * | 3/2009 | Lindemann .................. | 474/101 |
| 2009/0212175 | A1 * | 8/2009 | Yen et al. ............... | 248/123.11 |

* cited by examiner

*Primary Examiner*—Terrell Mckinnon
*Assistant Examiner*—Michael McDuffie
(74) *Attorney, Agent, or Firm*—Guice Patents PLLC

(57) ABSTRACT

The present invention relates to a supporting structure, includes a retractable connecting unit, a bottom pivotal shaft device, a top pivotal shaft device and at least one linking device. The retractable connecting unit is that a slide engaging sheet is provided on top of a fixed engaging sheet, and an adjusting member is provided between the fixed and the slide engaging sheets, a bottom end and a top end are respectively provided at the bottom portion and the top portion of the retractable connecting unit. The linking device is that a bottom shaft wheel and a top shaft wheel are respectively provided between the bottom end and the top end of the lateral side of the connecting unit and between bottom supporting racks of the bottom pivotal shaft device and top supporting racks of the top pivotal shaft device, and respectively and pivotally connecting to the bottom pivotal shaft device and the top pivotal shaft device, and a flexible band is provided between the top and the bottom shaft wheels; by adjusting the adjusting member, the slide engaging sheet can move alongside the fixed engaging sheet, so the lengths of the retractable connecting unit and the top and the bottom shaft wheels disposed at the lateral side of the retractable connecting unit are changed, and a proper tension is maintained by the flexible band.

18 Claims, 5 Drawing Sheets

SUPPORTING STRUCTURE AND TENSION ADJUSTING MECHANISM THEREOF

BACKGROUND OF THE INVENTION

1. Field of the Invention

The present invention relates to a supporting structure, more particularly to an elevating structure having tension adjusting mechanism. The present invention further provides to a tension adjusting mechanism used in an elevating structure, wherein tension of a linking device provided transversally and pivotally to a retractable connecting unit can be properly adjusted via changing distance.

2. Description of Related Art

A flat panel monitor, e.g. a LCD monitor, a LCD TV or a plasma TV, has advantages of light in weight, thin in thickness, and no radiation. Therefore, most of CRT TVs are replaced. When viewing a LCD or a plasma TV, there is a viewing limitation angle, at least one structure of rotation shaft is provided at the bottom seat of the monitor, so the monitor is provided with a function of angle adjusting relative to the bottom seat.

But such art can not allow the flat panel monitor move both upwardly/downwardly and forwardly/backwardly. An auxiliary connecting unit disposed in parallel is therefore invented, e.g. end sections of two connecting rods are respectively connected to a main hinge provided on a top end of a connecting unit and a base hinge provided on a bottom end of the connecting unit. The connecting unit, the auxiliary connecting unit, the main hinge and the base hinge are defined as a linkage mechanism, and the auxiliary connecting unit is served to convert the rotation movement of the connecting unit relative to the bottom seat into a tiling movement of the monitor main body. In other words, when the height of the monitor main body is adjusted, the original angle of the monitor main body is kept the same during the adjustment.

The applicant of the present invention has been devoting himself to break through the market of supporting structure for monitors in which the linkage mechanism is taken by providing a novel linking device. Referring to the U.S. patent application Ser. No. 11/896,930, "ELEVATION-ADJUSTABLE SUPPORT STRUCTURE", wherein a linking device of the supporting structure is provided by a bottom shaft wheel and a top shaft wheel respectively being provided between a bottom end and a top end of one lateral side of the connecting unit and between a bottom supporting rack and a top supporting rack, and respectively and pivotally connecting to a bottom pivotal shaft device and a top pivotal shaft device, and a flexible band is provided between the top and the bottom shaft wheels; the linking device is served to convert the circular rotation of the connecting unit into rotations of the two top supporting racks for compensating displacements, so the angles of the two top supporting racks are remained the same, so when the supporting structure is applied on an object to be supported, e.g. a flat panel monitor, the original angle of the object is remained the same while the height thereof is being adjusted.

In the above mentioned art, the top shaft wheel and the bottom shaft wheel are linked via a flexible band, if the tension between the top and the bottom shaft wheels and the flexible band is not strong enough, a lose status may be generated and an anticipating linking result may not be obtained.

SUMMARY OF THE INVENTION

The applicant of the present invention has devoted himself to design and commercially distribute rotation shafts and has an intention that by providing a tension adjusting mechanism, the tension between a flexible band and a top and a bottom shaft wheels can be adjusted to a proper strength, so an anticipating linking result can be obtained; after try and error, the present invention, "Supporting structure and tension adjusting mechanism thereof" is provided.

For achieving the object mentioned above, the present invention provides a supporting structure, includes a retractable connecting unit, a slide engaging sheet is provided on top of a fixed engaging sheet, and an adjusting member is provided between the fixed and the slide engaging sheets, a bottom end and a top end are respectively provided at the bottom portion and the top portion of the retractable connecting unit; a bottom pivotal shaft device pivotally connected to the bottom end of the retractable connecting unit via a rotation shaft, and the retractable connecting unit is rotatably and pivotally connected between a plurality of bottom supporting racks of the bottom pivotal shaft device; a top pivotal shaft device pivotally connected to the top end of the retractable connecting unit via another rotation shaft, and the retractable connecting unit is rotatably and pivotally connected to two top supporting racks of the top pivotal shaft device; at least one linking device, a bottom shaft wheel and a top shaft wheel are respectively provided between the bottom end and the top end of the lateral side of the retractable connecting unit and between the bottom supporting racks and the top supporting racks, and respectively and pivotally connected to the bottom pivotal shaft device and the top pivotal shaft device, and a flexible band is provided between the bottom and the top shaft wheels; by adjusting the adjusting member, the slide engaging sheet can move alongside the fixed engaging sheet, so the lengths of the retractable connecting unit and the top and the bottom shaft wheels disposed at the lateral side of the retractable connecting unit are changed, and a proper tension is maintained by the flexible band.

Another object of the present invention is to provide a tension adjusting mechanism used in a supporting structure, includes a retractable connecting unit, a slide engaging sheet is provided on top of a fixed engaging sheet, and an adjusting member is provided between the fixed and the slide engaging sheets, a bottom end and a top end are respectively provided at the top portion and the bottom portion of the retractable connecting unit; at least one linking device, a bottom shaft wheel and a top shaft wheel are respectively provided on the bottom end and the top end of the lateral side of the retractable connecting unit, and a flexible band is provided between the bottom and the top shaft wheels; by adjusting the adjusting member, the slide engaging sheet can move alongside the fixed engaging sheet, so the lengths of the retractable connecting unit and the top and the bottom shaft wheels disposed at the lateral side of the retractable connecting unit are changed, and a proper tension is maintained by the flexible band.

DETAILED DESCRIPTION OF THE PREFERRED EMBODIMENT

Figure 1:
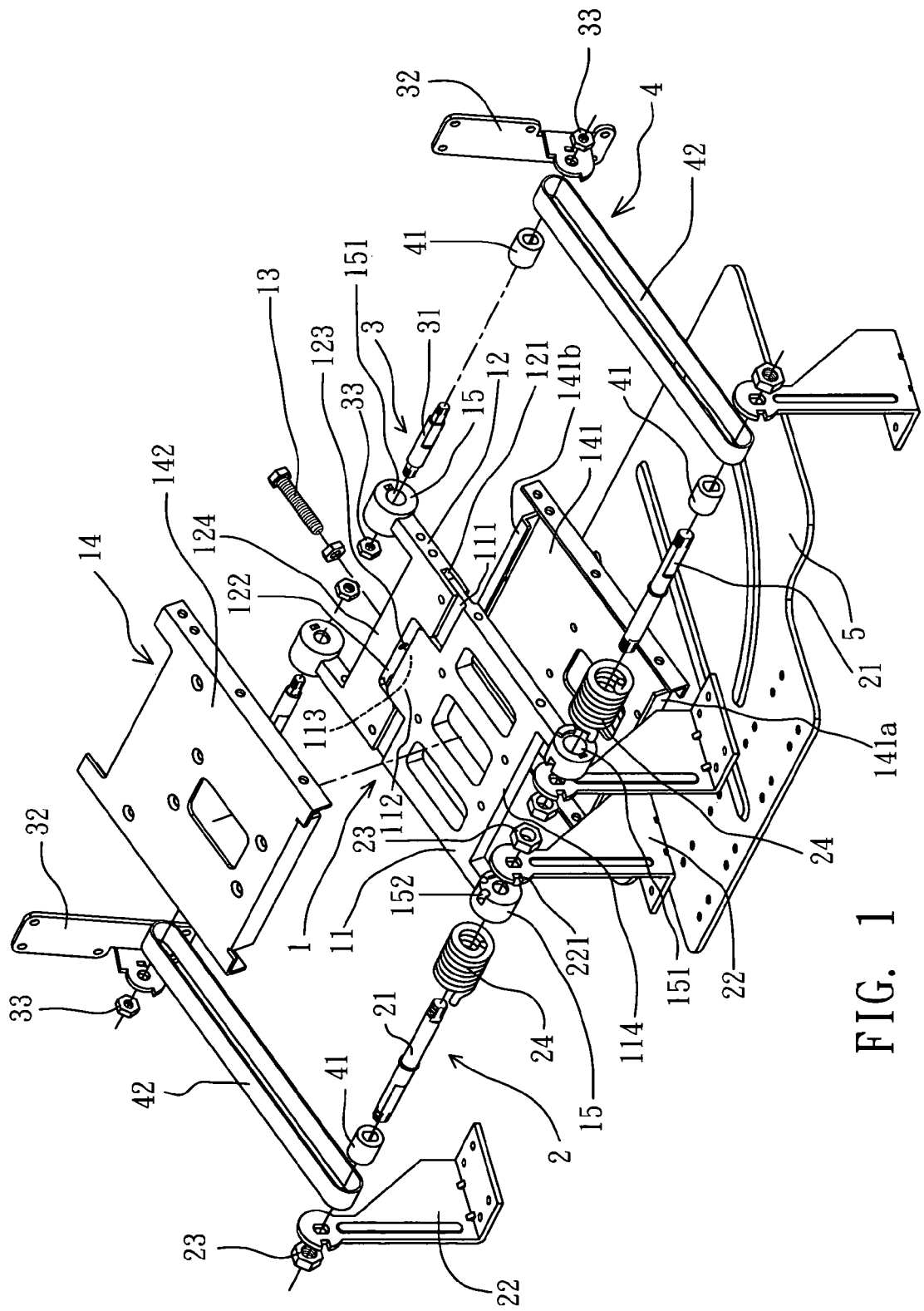
FIG. 1 is a 3D exploded view of the supporting structure provided by the present invention.
Figure 2:
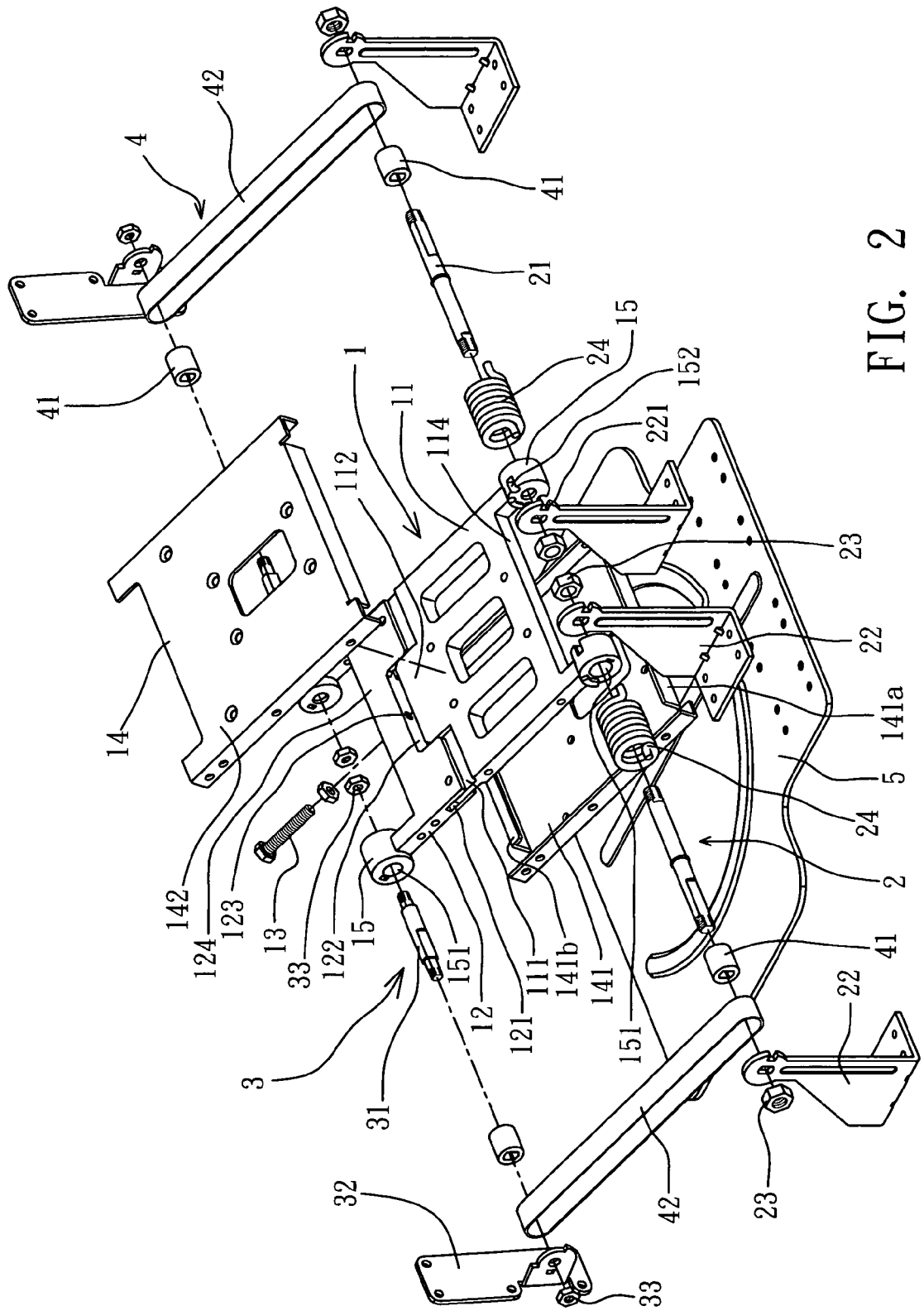
FIG. 2 is a 3D exploded view of the supporting structure provided by the present invention viewed from a different angle.
Figure 3:
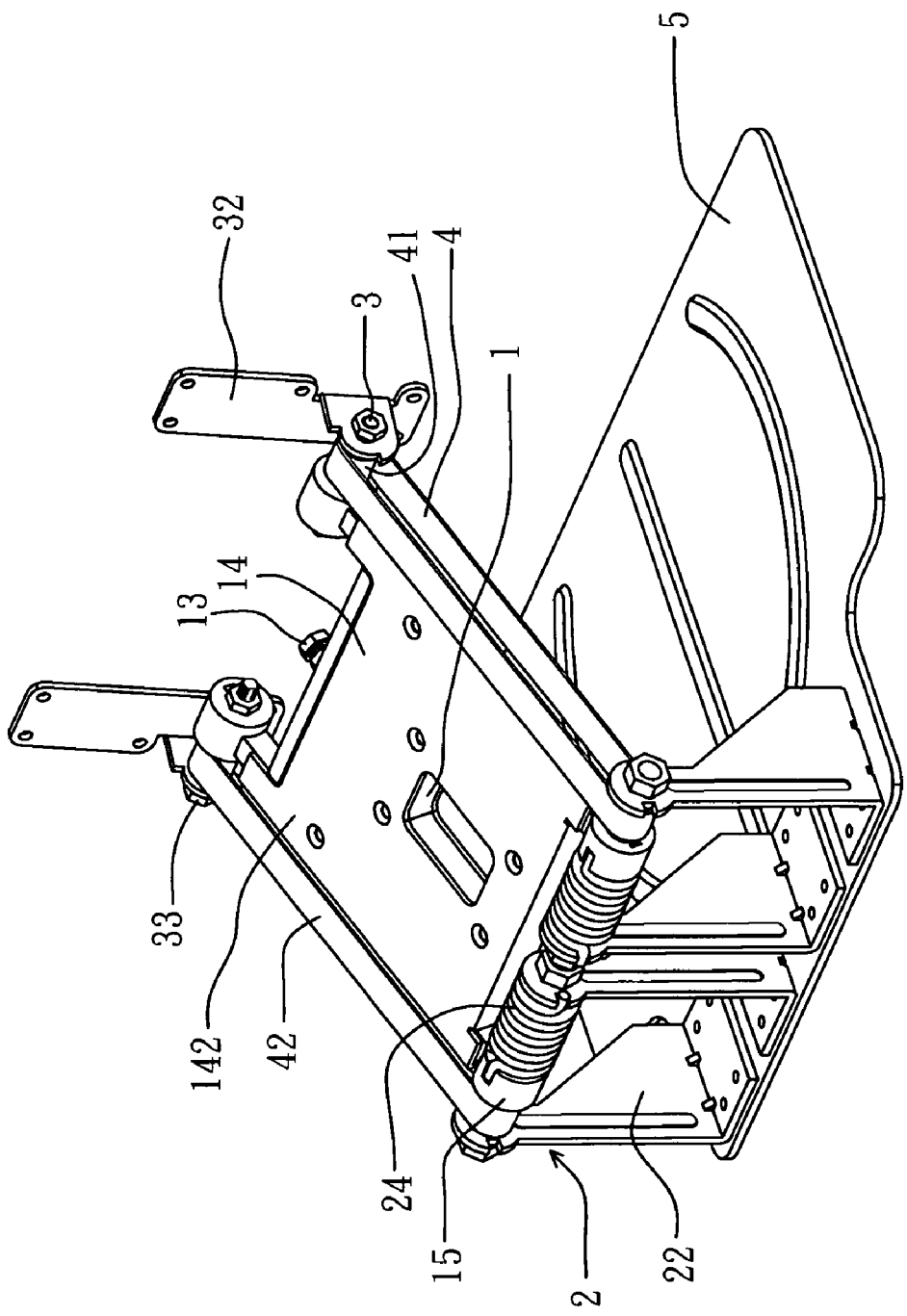
FIG. 3 is a 3D view of the supporting structure provided by the present invention after being assembled.

As shown from FIG. 1 to FIG. 3, the supporting structure provided by the present invention is composed by a retractable connecting unit 1, a bottom pivotal shaft device 2, a top pivotal shaft device 3, and at least one linking device 4.

The retractable connecting unit 1 is that a slide engaging sheet 12 is provided and disposed on top of a fixed engaging sheet 11, the slide engaging sheet 12 can move alongside the fixed engaging sheet 11 so the length of the retractable connecting unit 1 can be prolonged or shorten for adjusting the tension of the linking device 4. As shown in FIG. 1 and FIG. 2, a wing sheet 111 is respectively provided at central of the two lateral ends of the fixed engaging sheet 11, a rectangle tenon 112 is defined between the two wing sheets 111; two sliding slots 121 and a concave slot 122 are respectively provided on the slide engaging sheet 12 with respect to the two wing sheets 111 and the tenon 112, and the wing sheets 111 and the sliding slots 121 can be engaged, also the concave slot 122 and the tenon 112, so the slide engaging sheet 12 can radially move alongside the fix engaging sheet 11. For adjusting the retractions of the fixed engaging sheet 11 and the slide engaging sheet 12, an adjusting member 13 is provided and radially screwed in a screw hole 123 provided throughout the concave slot 122, and the end section of the adjusting member 13 is pressed into a positioning hole 113 provided with respect to the tenon 112. When the adjusting member 13 is rotated, the slide engaging sheet 12 move toward the fixed engaging sheet 11 or toward a reverse direction, so the length of the retractable connecting unit 1 can be adjusted.

The retractable connecting unit 1 is covered by a housing 14, the housing 14 is provided with a bottom cover 141 and a top cover 142 and the retractable connecting unit 1 is received between the bottom cover 141 and the top cover 142. The bottom cover 141 is provided with a bottom blocking sheet 141a and a top blocking sheet 141b for preventing the fixed engaging sheet 11 and the slide engaging sheet 12 from separating with each other, in other words the slide engaging sheet 12 is only allowed to move within the housing 14.

The top portion and the bottom portion of the retractable connecting unit 1 are respectively provided with a bottom end 114 and a top end 124, and the bottom end 114 and the top end 124 are respectively and pivotally connected to a base seat 5 and a top rack (not shown) via the bottom pivotal shaft device 2 and the top pivotal shaft device 3 so as to form a swinging status. As shown in FIG. 1 and FIG. 2, the lateral ends of the top end 124 and the bottom end 114 are respectively and extendedly provided with a pair of lugs 15, each of the lugs 15 has a throughout shaft hole 151.

The bottom pivotal shaft device 2 is that two rotation shafts are respectively provided on the bottom pair of lugs 15 of the bottom end 114 of the retractable connecting unit 1, as shown in FIG. 1 and FIG. 2, a fixing shaft rod 21 of each of the rotation shafts is provided and inserted into the corresponding shaft holes 151 of the bottom pair of lugs 15, so a structure of rotation shaft having a function of radial friction is obtained.

Two ends of each of the fixing shaft rods 21 are respectively mounted into the two bottom supporting racks 22 fixed on the surface of the base seat 5, and two end sealing members 23, e.g. anti-releasing nuts, are respectively connected to the thread sections of the fixing shaft rods 21, so the retractable connecting unit 1 can be rotatably and pivotally connected to the four bottom supporting racks 22 of the bottom pivotal shaft device 2. A torsion spring 24 is respectively provided between each of the two bottom lugs 15 and the corresponding fixing shaft rod 21 adjacently provided, two ends of each of the torsion springs 24 are respectively connected to a lug slot 152 preset on the corresponding bottom lug 15 and a rack slot 221 provided at the inner side of the corresponding bottom supporting rack 22, so when the retractable connecting unit 1 is downwardly swung, the torsion springs 24 are pressed and energy is therefore stored.

The top pivotal shaft device 3 is that two rotation shafts are respectively provided on the top pair of lugs 15 of the top end 124 of the retractable connecting unit 1, as shown in FIG. 1 and FIG. 2, a mobile shaft rod 31 of each of the rotation shafts is provided and inserted into the corresponding shaft holes 151 of the top pair of lugs 15, so a structure of rotation shaft having a function of radial friction is obtained. The outer end of each of the mobile shaft rods 31 passes through a top supporting rack 32 and the inner end of each of the mobile shaft rods 31 passes through the corresponding top lug 15, and two ends of each of the mobile shaft rods 31 are respectively provided with an end sealing member 33, e.g. an anti-releasing nut, so the retractable connecting unit 1 can be rotatably and pivotally connected to the two top supporting racks 32 of the top pivotal shaft device 3. The two top supporting racks 32 can be respectively provided with a top rack (not shown) for being connected to an object to be supported.

The linking device 4 is that two shaft wheels 41 are respectively provided at the outer ends of the bottom end 114 and the top end 124 of the retractable connecting unit 1, and respectively and pivotally connected to the fixing shaft rod 21 of the bottom pivotal shaft device 2 and the mobile shaft rod 31 of the top pivotal shaft device 3. In order to let the bottom and the top shaft wheels 41 respectively provided on the fixing shaft rod 21 and the mobile shaft rod 31 be equipped with a function of converting a circular motion into a linear movement, as the same as a four-rod linkage structure. A flexible band 42 is provided between the two shaft wheels 41. As shown in figures, the flexible band 42 can be, but not limited to, a leather band, a chain, a rope or a tooth-shaped belt, and each of the shaft wheels 41 can correspondingly be a chain wheel or a gear wheel, so the teeth can mate the chain or the tooth-shaped belt, an anticipating effect of four-rod linkage is therefore obtained.

FIG. 3 is a 3D exploded view of the supporting structure provided by the present invention after being assembled. The bottom end 114 of the retractable connecting unit 1 is connected to the base seat 5 via the bottom supporting racks 22 of the bottom pivotal shaft device 2, and the top end 124 thereof is connected a top rack via the top supporting racks 32 of the top pivotal shaft device 3, and the top rack is connected to an object to be supported, such as a fiat panel monitor, so a supporting structure is obtained.

Figure 4:
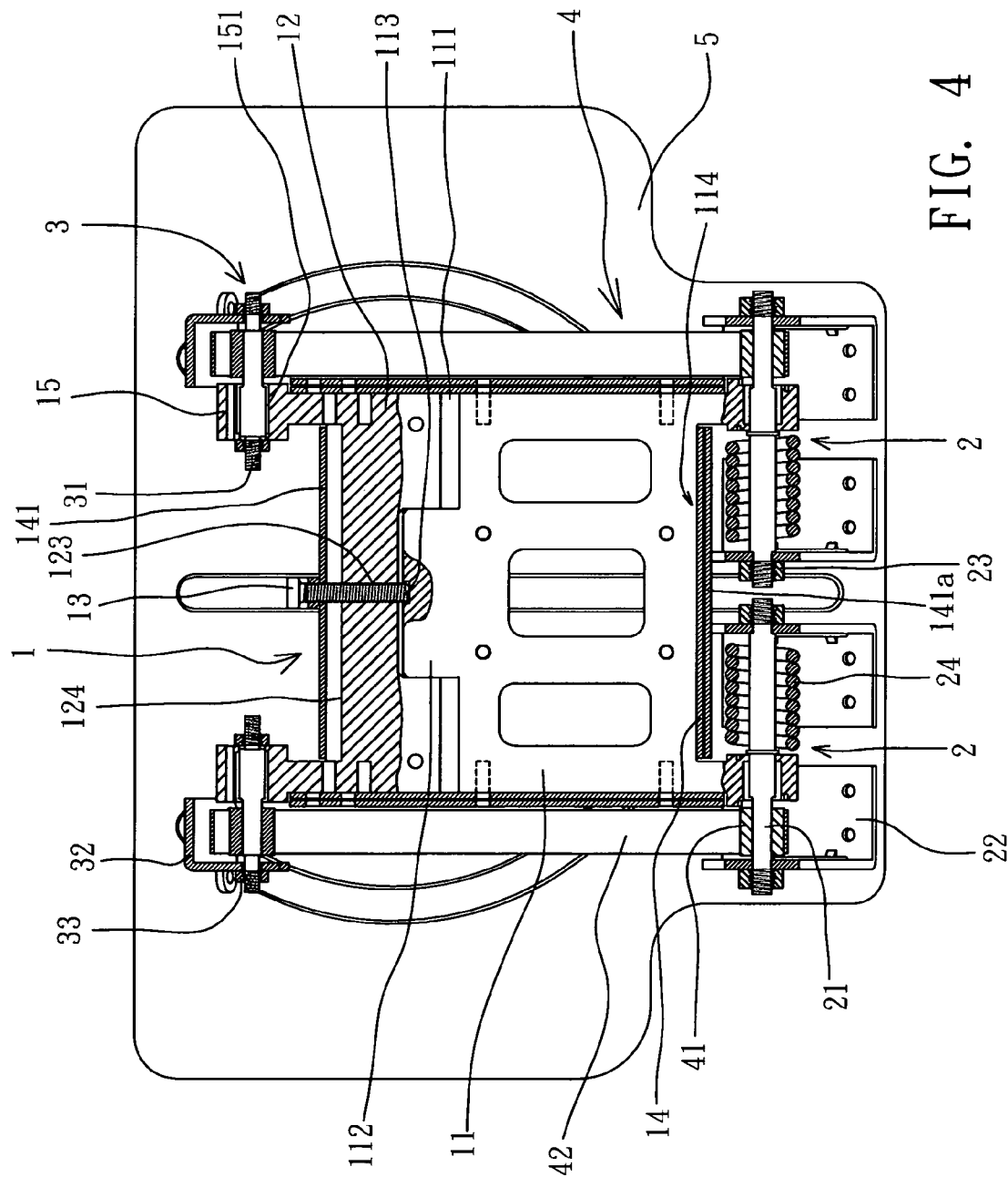
FIG. 4 is a cross sectional view of the tension adjusting mechanism provided by the present invention in a lose status.

Referring to FIG. 4, which is a schematic view of the supporting structure in which the tension between the two shaft wheels 41 of the linking device 4 is not adjusted yet, at this moment the distance between the two shaft wheels 41 are relatively close so the flexible band 42, e.g. a leather band, can be easily provided between the two shaft wheels 41. Because an operation of adjusting tension is not processed yet, the retractable connecting unit 1 and a tension adjusting mechanism of the linking device 4 are both in a lose status, in other words if the height of the object to be supported is desired to be adjusted at this moment, the original angle of the object will be changed and the anticipating linking result can not be achieved.

Figure 5:
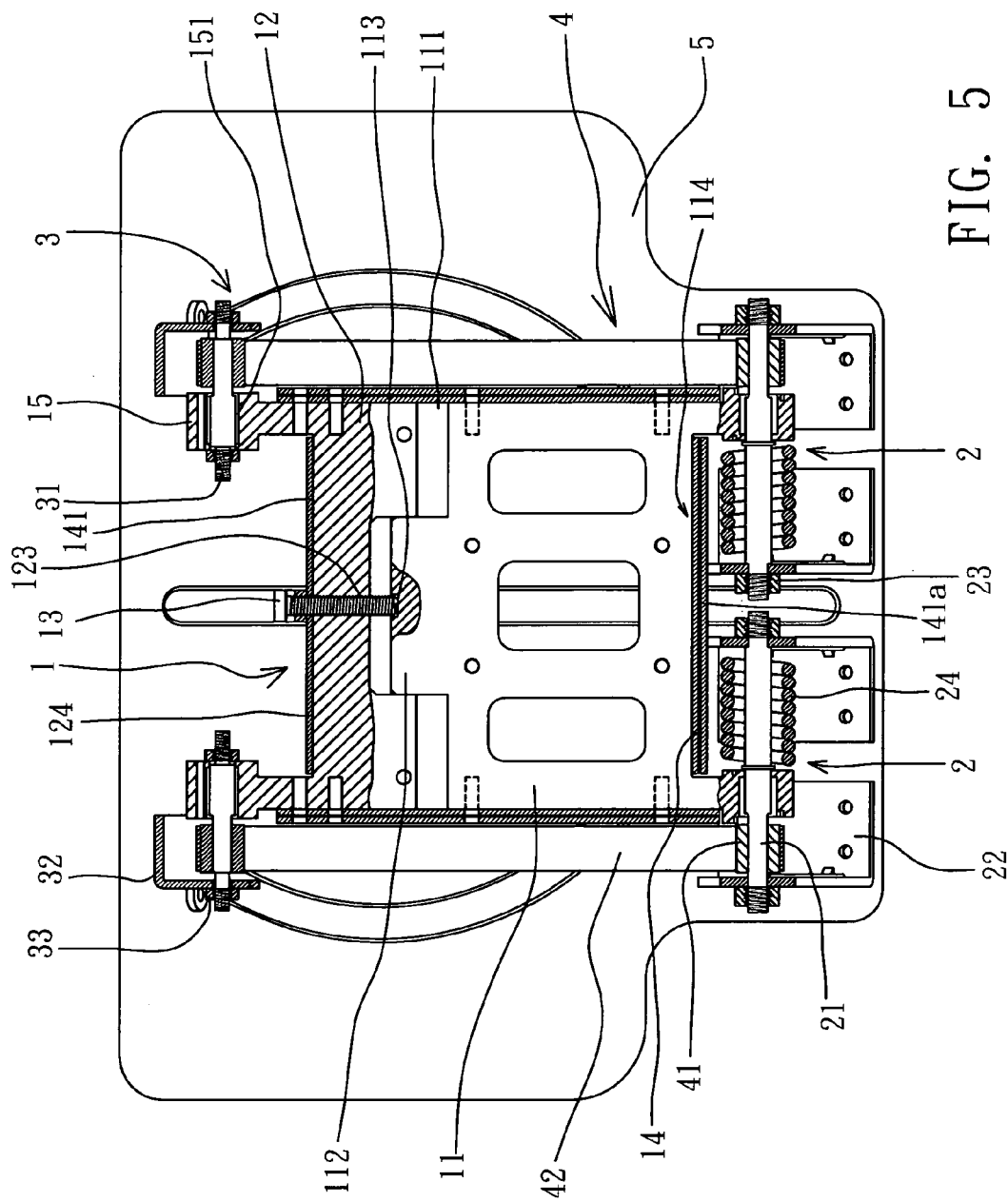
FIG. 5 is a cross sectional view of the tension adjusting mechanism provided by the present invention in a tight status.

Referring to FIG. 5, when the adjusting member 13 is rotated, slide engaging sheet 12 upwardly moves alongside the rail formed by the slide engaging sheet 12 and the fixed engaging sheet 11, so the gap between the slide engaging sheet 12 and the fixed engaging sheet 11 is increased and the whole length of the retractable connecting unit 1 is therefore increased, so the tension adjusting mechanism is in a tight status.

If the height of the object to be supported, e.g. a flat panel monitor, the retractable connecting unit 1 is upwardly or downwardly rotated around the fixing shaft rod 21 of the bottom pivotal shaft device 2 as an axial core, because at least one linking device 4 is operated the same as a four-rod linkage structure, the flexible band 42 will not be rotated by the retractable connecting unit 1. When the retractable connecting unit 1 is swung and a displacement is generated, a dislocation of the flexible band 42 is generated with respect to the swinging angle of the retractable connecting unit 1, so the bottom shaft wheel 41 connected with the flexible band 42 is not rotated, and the top shaft wheel 41, the two mobile shaft rods 31 and the two top supporting racks 32 are rotated with respect to the top lugs 15 of the retractable connecting unit 1 for compensating the displacement, so height and forward/backward distance are changed but the original angle of the object connected to the top rack is remained the same. In other words, the original angles of the two top supporting racks 32 will not be affected by the rotation of the retractable connecting unit 1.

The present invention discloses an art that by rotating the adjusting member, the distance between the fixed engaging sheet and the slide engaging sheet of the retractable connecting unit can be changed, also the distance between the top and the bottom shaft wheels respectively and pivotally connected to the top and the bottom pivotal shaft devices and respectively provided at the lateral end of the top end and the bottom end of the retractable connecting unit is changed, so the tension of the flexible band provided between the two shaft wheels can be properly maintained, and the anticipating linking result can be achieved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A supporting structure, comprises:
    a retractable connecting unit, a slide engaging sheet is provided on top of a fixed engaging sheet, and an adjusting member is provided between the fixed and the slide engaging sheets, a bottom end and a top end are respectively provided at the bottom portion and the top portion of the retractable connecting unit;
    a bottom pivotal shaft device pivotally connected to the bottom end of the retractable connecting unit via a rotation shaft, and the retractable connecting unit is rotatably and pivotally connected between a plurality of bottom supporting racks of the bottom pivotal shaft device;
    a top pivotal shaft device pivotally connected to the top end of the retractable connecting unit via a rotation shaft, and the retractable connecting unit is rotatably and pivotally connected to two top supporting racks of the top pivotal shaft device;
    at least one linking device, a bottom shaft wheel and a top shaft wheel are respectively provided between the bottom end and the top end of the lateral side of the retractable connecting unit and between the bottom supporting racks and the top supporting racks, and respectively and pivotally connected to the bottom pivotal shaft device and the top pivotal shaft device, and a flexible band is provided between the bottom and the top shaft wheels;
    by adjusting the adjusting member, the slide engaging sheet can move alongside the fixed engaging sheet, so the lengths of the retractable connecting unit and the top and the bottom shaft wheels disposed at the lateral side of the retractable connecting unit are changed, and a proper tension is maintained by the flexible band.

2. The supporting structure as claimed in claim 1, wherein two wing sheets are respectively provided at central of the two lateral ends of the fixed engaging sheet, a rectangle tenon is defined between the two wing sheets; two sliding slots and a concave slot are respectively provided on the slide engaging sheet with respect to the two wing sheets and the tenon, and the wing sheets and the sliding slots can be engaged, also the concave slot and the tenon, so the slide engaging sheet can radially move alongside the fix engaging sheet; the adjusting member is radially screwed in a screw hole provided throughout the concave slot, and the end section of the adjusting member is pressed into a positioning hole provided with respect to the tenon.

3. The supporting structure as claimed in claim 1, wherein a top pair of lugs and a bottom pair of lugs are respectively and extendedly provided on the top end and the bottom end of the retractable connecting unit, and each of the lugs has a through shaft hole for respectively being connected to the top pivotal shaft device and the bottom pivotal shaft device.

4. The supporting structure as claimed in claim 1, wherein two of the bottom supporting racks and the two top supporting racks are respectively connected to a base seat and a top rack, and the top rack is connected to an object to be supported.

5. The supporting structure as claimed in claim 1, wherein the retractable connecting unit is covered by a housing, the housing is provided with a bottom cover and a top cover and the retractable connecting unit is received between the bottom cover and the top cover; the bottom cover is provided with a bottom blocking sheet and a top blocking sheet for limiting the slide engaging sheet only moves within the housing.

6. The supporting structure as claimed in claim 1, wherein the flexible band is a leather band or a rope.

7. The supporting structure as claimed in claim 1, wherein the flexible band is a chain or a tooth-shaped belt, and each of the shaft wheels can correspondingly be a chain wheel or a gear wheel.

8. The supporting structure as claimed in claim 1, wherein the rotation rod of the bottom pivotal shaft device is mounted into the shaft hole correspondingly at the bottom end of the retractable connecting unit via a fixing shaft rod, two ends of each of the fixing shaft rods are respectively mounted into the two bottom supporting racks fixed on the surface of the base seat, so the retractable connecting unit can be rotatably and pivotally connected to the top supporting racks of the bottom pivotal shaft device.

9. The supporting structure as claimed in claim 8, wherein a torsion spring is respectively provided to the fixing shaft rods disposed between the two bottom lugs, two ends of the each of the torsion spring is respectively connected to the bottom lug and the bottom supporting rack.

10. The supporting structure as claimed in claim 1, wherein the rotation shaft of the top pivotal shaft device is mounted into the shaft hole of the top lug corresponding provided at the top end of the retractable connecting device via a mobile shaft rod, the outer end of each of the mobile shaft rods passes through the top supporting rack and the inner end of each of the mobile shaft rods passes through the top lugs, so the retractable connecting unit can be rotatably and pivotally connected to the top supporting racks of the top pivotal shaft device.

11. A tension adjusting mechanism used in supporting structure, comprises:
   a retractable connecting unit, a slide engaging sheet is provided on top of a fixed engaging sheet, and an adjusting member is provided between the fixed and the slide engaging sheets, a bottom end and a top end are respectively provided at the top portion and the bottom portion of the retractable connecting unit;
   at least one linking device, a bottom shaft wheel and a top shaft wheel are respectively provided on the bottom end and the top end of the lateral side of the retractable connecting unit, and a flexible band is provided between the bottom and the top shaft wheels; by adjusting the adjusting member, the slide engaging sheet can move alongside the fixed engaging sheet, so the lengths of the retractable connecting unit and the top and the bottom shaft wheels disposed at the lateral side of the retractable connecting unit are changed, and a proper tension is maintained by the flexible band,
   wherein two wing sheets are respectively provided at central of the two lateral ends of the fixed engaging sheet, a rectangle tenon is defined between the two wing sheets; two sliding slots and a concave slot are respectively provided on the slide engaging sheet with respect to the two wing sheets and the tenon, and the wing sheets and the sliding slots can be engaged, also the concave slot and the tenon, so the slide engaging sheet can radially move alongside the fix engaging sheet; the adjusting member is radially screwed in a screw hole provided throughout the concave slot, and the end section of the adjusting member is pressed into a positioning hole provided with respect to the tenon.

12. The tension adjusting mechanism as claimed in claim 11, wherein a top pair of lugs and a bottom pair of lugs are respectively and extendedly provided on the top end and the bottom end of the retractable connecting unit, and each of the lugs has a through shaft hole for respectively being connected to the top shaft wheel and the bottom shaft wheel.

13. A tension adjusting mechanism used in supporting structure, comprises:
   a retractable connecting unit, a slide engaging sheet is provided on top of a fixed engaging sheet, and an adjusting member is provided between the fixed and the slide engaging sheets, a bottom end and a top end are respectively provided at the top portion and the bottom portion of the retractable connecting unit;
   at least one linking device, a bottom shaft wheel and a top shaft wheel are respectively provided on the bottom end and the top end of the lateral side of the retractable connecting unit, and a flexible band is provided between the bottom and the top shaft wheels; by adjusting the adjusting member, the slide engaging sheet can move alongside the fixed engaging sheet, so the lengths of the retractable connecting unit and the top and the bottom shaft wheels disposed at the lateral side of the retractable connecting unit are changed, and a proper tension is maintained by the flexible band,
   wherein the retractable connecting unit is covered by a housing, the housing is provided with a bottom cover and a top cover and the retractable connecting unit is received between the bottom cover and the top cover; the bottom cover is provided with a bottom blocking sheet and a top blocking sheet for limiting the slide engaging sheet only moves within the housing.

14. The tension adjusting mechanism as claimed in claim 11, wherein the flexible band is a leather band or a rope.

15. The tension adjusting mechanism as claimed in claim 11, wherein the flexible band is a chain or a tooth-shaped belt and each of the shaft wheels can correspondingly be a chain wheel or a gear wheel.

16. The tension adjusting mechanism as claimed in claim 13, wherein a top pair of lugs and a bottom pair of lugs are respectively and extendedly provided on the top end and the bottom end of the retractable connecting unit, and each of the lugs has a through shaft hole for respectively being connected to the top shaft wheel and the bottom shaft wheel.

17. The tension adjusting mechanism as claimed in claim 13, wherein the flexible band is a leather band or a rope.

18. The tension adjusting mechanism as claimed in claim 13, wherein the flexible band is a chain or a tooth-shaped belt and each of the shaft wheels can correspondingly be a chain wheel or a gear wheel.

* * * * *